US008281469B2

(12) United States Patent
King

(10) Patent No.: US 8,281,469 B2
(45) Date of Patent: Oct. 9, 2012

(54) SEALING PLUG REMOVAL APPARATUS

(75) Inventor: Richard King, Welwyn (GB)

(73) Assignee: Avdel UK Limited, Welwyn Garden, Hertfordshire (GB)

( * ) Notice: Subject to any disclaimer, the term of this patent is extended or adjusted under 35 U.S.C. 154(b) by 1240 days.

(21) Appl. No.: 11/814,883

(22) PCT Filed: Apr. 10, 2006

(86) PCT No.: PCT/GB2006/001294
§ 371 (c)(1), (2), (4) Date: Mar. 18, 2008

(87) PCT Pub. No.: WO2006/109029
PCT Pub. Date: Oct. 19, 2006

(65) Prior Publication Data

US 2008/0276438 A1 Nov. 13, 2008

(30) Foreign Application Priority Data

Apr. 12, 2005 (GB) .................................. 0507368.9

(51) Int. Cl.
*B23P 19/02* (2006.01)

(52) U.S. Cl. ................. 29/235; 29/253; 29/254; 29/277

(58) Field of Classification Search .................... 29/244, 29/255, 270, 278, 253, 254, 271, 277
See application file for complete search history.

(56) References Cited

U.S. PATENT DOCUMENTS 2,486,084 A 10/1949 Webster
3,576,064 A * 4/1971 Brackin .......................... 29/254
3,947,945 A * 4/1976 Gulistan .......................... 29/235
4,724,608 A * 2/1988 Parrott ............................ 29/724
4,910,853 A * 3/1990 Sawdon ....................... 29/283.5
5,001,822 A * 3/1991 Upthegrove ..................... 29/275
5,090,102 A * 2/1992 Lovell ............................. 29/255
5,218,749 A * 6/1993 Upthegrove ..................... 29/275
5,355,572 A * 10/1994 Kammeraad et al. ........ 29/213.1
5,713,116 A * 2/1998 Nickerson et al. ....... 29/243.518
5,860,315 A * 1/1999 Sawdon ....................... 72/481.8
5,875,534 A 3/1999 Jackson
6,148,493 A * 11/2000 Pixley et al. .................... 29/275
6,360,415 B1 * 3/2002 Wada et al. .................. 29/283.5
6,415,492 B1 * 7/2002 Jamison .......................... 29/275
7,591,054 B2 * 9/2009 Baughman ................... 29/243.5
2008/0276438 A1 * 11/2008 King ............................... 29/255

FOREIGN PATENT DOCUMENTS

GB 2 319 200 A 5/1998

* cited by examiner

*Primary Examiner* — Lee D Wilson
(74) *Attorney, Agent, or Firm* — Hahn, Loeser & Parks LLP; Arland T. Stein

(57) ABSTRACT

Apparatus for removing a sealing plug from a bore, the sealing plug has an outer sleeve and an inner stem retained within the outer sleeve, the removal taking place after a suitable hole has been drilled part-way into the stem, the removal apparatus has a tapered punch for forcible insertion into the hole in the stem to create an interference fit between the punch and the stem and thereafter driving the stem out of the sleeve while also retaining the stem on the punch by virtue of the interference fit, and sleeve-engaging portion engagable with the sleeve after the punch has removed the stem from the sleeve, the sleeve-engaging portion and the punch being thereafter removable from the bore to remove both the sleeve and the stem from the bore while the sleeve and the stem are both retained on the appropriate parts of the apparatus.

7 Claims, 3 Drawing Sheets

STEP 1 STEP 2

SEALING PLUG REMOVAL APPARATUS

RELATED/PRIORITY APPLICATION

This application is a National Phase filing regarding International Application No. PCT/GB2006/001294 filed on Apr. 10, 2006. International Application No. PCT/GB2006/001294 filed on Apr. 10, 2006 relies upon British Application No. 0507368.9, filed on Apr. 12, 2005, for priority.

BACKGROUND AND SUMMARY

The invention relates to apparatus for removing a sealing plug from a bore.

A sealing plug is usually initially installed in a bore with the intention of remaining installed permanently. However it is sometimes necessary to remove such a sealing plug e.g. for the purpose of maintenance or repair of the equipment in which it is installed. The present invention relates to apparatus for removing a sealing plug. More particularly, the invention relates to apparatus for removing a sealing plug of the type which comprises an outer sleeve and an inner stem retained within the outer sleeve. For example, one such plug is that commercially available under the Registered Trade Mark AVSEAL.

The closest prior art of which the Applicants are aware is GB 2 319 200 A, which is discussed later.

The invention provides, in one of its aspects, an apparatus for removing a sealing plug from a bore, which sealing plug comprises an outer sleeve and an inner stem retained within the outer sleeve, the removal taking place after a suitable hole has been drilled part of the way into the stem, which removal apparatus comprises: a tapered punch for forcible insertion into the hole in the stem thereby to create an interference fit between the punch and the stem and thereafter driving the stem out of the sleeve whilst also retaining the stem on the punch by virtue of the interference fit; and sleeve-engaging means engagable with the sleeve after the punch has removed the stem from the sleeve; the sleeve-engaging means and the punch being thereafter removeable from the bore thereby to remove both the sleeve and the stem from the bore whilst the sleeve and the stem are both retained on the appropriate parts of the apparatus.

BRIEF DESCRIPTION OF THE DRAWINGS

A specific embodiment of the invention will now be described by way of example and with reference to the accompanying drawings, in which:—

DETAILED DESCRIPTION OF THE DRAWINGS

Figure 1:
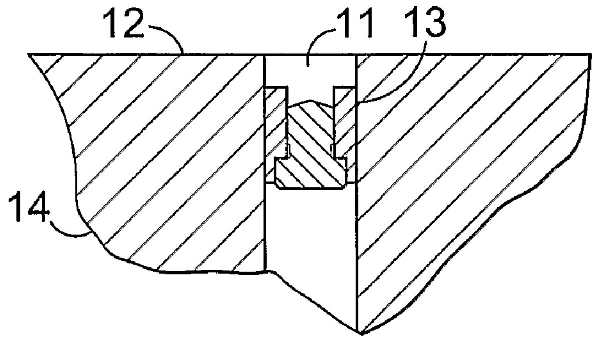
FIG. 1 shows a plug installed in a bore.

FIG. 1 shows in axial section a plug of the AVSEAL® type installed in a bore 11 in a workpiece 12. As will be well known by the person skilled in the art, the plug comprises a relatively softer metal sleeve 13 into which has been pulled a relatively harder metal stem 14 so that the enlarged head of the stem has entered the sleeve and radially expanded it into sealing and engaging contact with the wall of the bore 11, increasing tension on the stem causing it to fracture at a position somewhat inside the sleeve.

Figure 3:
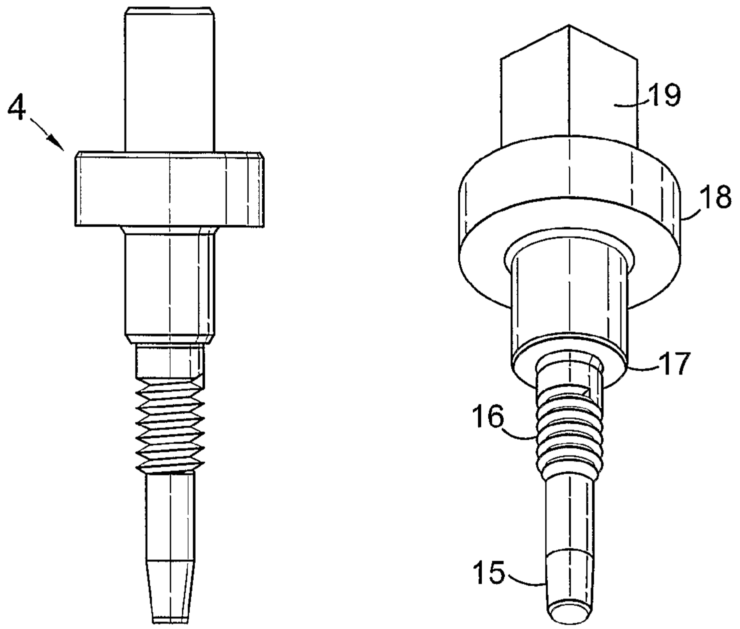
FIG. 3 shows in elevation and perspective view of the plug-removal tool.

FIG. 3 shows the plug removal tool 4, which is a unitary structure made of hard steel. At its fore end is a tapered punch 15, behind which is an externally threaded section 16. Behind this are successively a cylindrical body portion 17, a strong external flange 18 and a square-section wrenching portion 19. The dimensions of the taper 15 and screw 16 are appropriate to engage the plug in the manner to be described.

Figure 2:
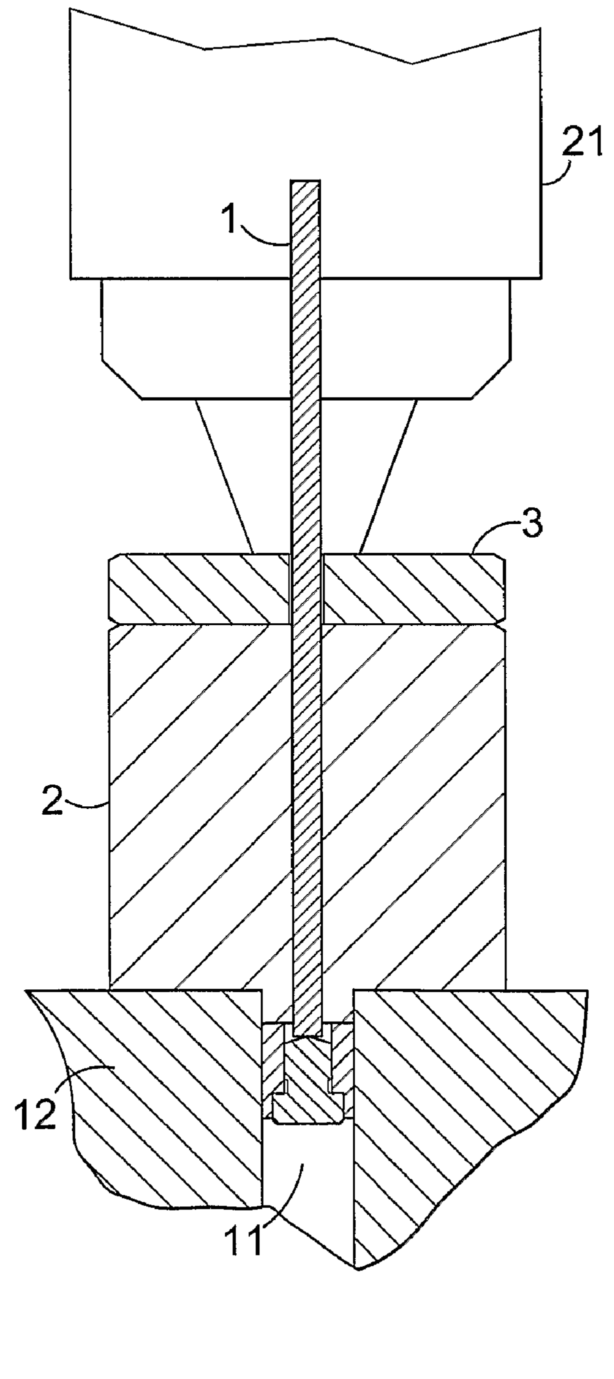
FIG. 2 shows drilling a hole part way into the plug stem.

Before the extraction tool 4 is used it is necessary to drill an appropriate hole in the plug stem, as shown in FIG. 2. A drill guide 2 is placed so that its central projecting spigot locates within the bore 11 (or alternatively the spigot is dimensioned to fit into the bore of the plug sleeve in applications where the plug top face is flush with the workpiece surface). A drill bit 1 (not yet inserted in a drill chuck) is inserted into the bore through the drill guide and enters into the end of the plug and contacts the near end face of the plug stem 14 inside the plug sleeve 13. A removable spacer 3 having a central aperture is the placed over the upper end of the drill bit and in contact with the top of the drill guide 2. The drill chuck is then placed over the drill bit 1, so that the front end of the chuck is in contact with the spacer 3, and the chuck is tightened onto the drill bit, making sure that the tip of the drill bit remains in contact with the plug stem and the drill guide and spacer are also in contact. The drill bit 1 is now pulled out thus releasing the spacer 3 which is removed. The drill bit is reinserted into the guide to contact the plug stem, and the drill actuated to drill a hole in the plug stem until the drill chuck front end contacts the drill guide. This ensures that the length of hole drilled into the plug stem is appropriate for engagement by the extraction tool punch, as will now be described. The drill bit 1 and guide 2 are now removed, and any swarf which may have been produced is also completely removed from the top of the bore 11.

Figure 4:
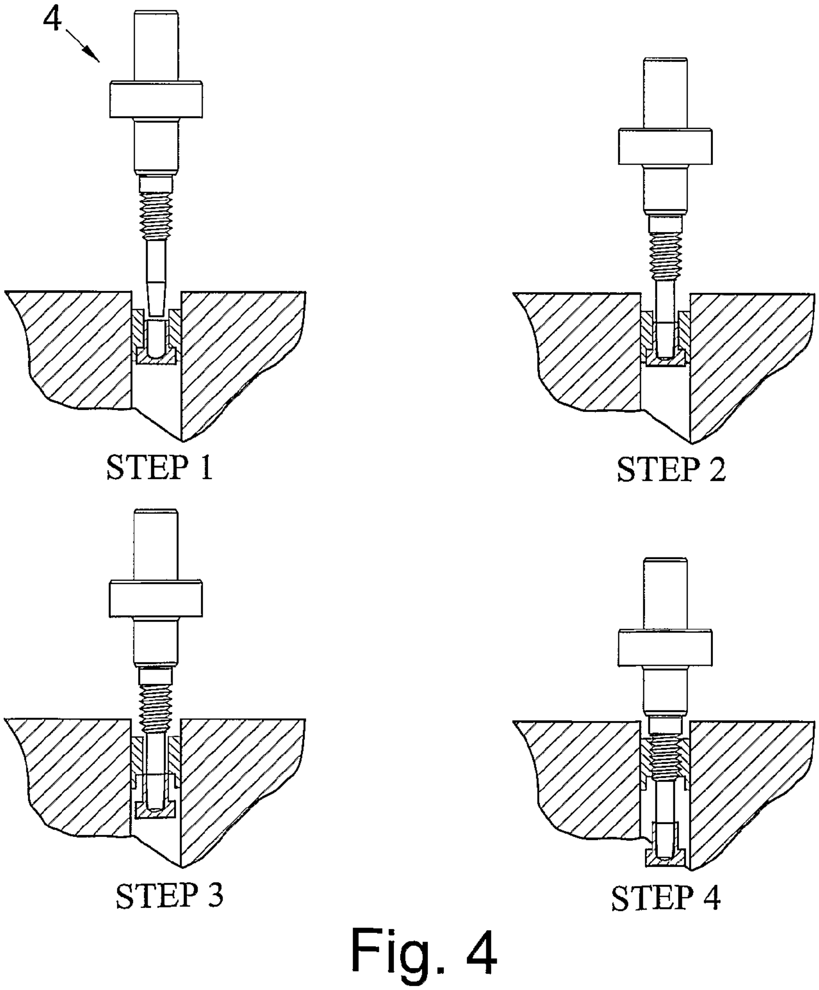
FIG. 4 shows four successive steps in the use of the apparatus to engage the plug.

The extraction tool 4 is now brought into action, successive stages in its use to remove the plug being illustrated in Steps 1 to 4 in FIG. 4.

In Step 1, the tip of the tapered punch 15 is inserted into the hole which has just been drilled in the plug stem, the diameter of this drilled hole being intermediate between the diameter of the narrow and wide ends of the punch, the diameter of the drill having been chosen accordingly. In Step 2, using a mallet (not shown) the extraction tool is hammered towards the plug so that the tapered punch fully enters the drilled hole in the plug stem. In Step 3, further hammering drives the plug stem out of engagement with the sleeve. The plug stem is retained on the tapered punch by virtue of the interference fit between the tapered punch and the plug. The tapered portion of the punch has passed completely through the sleeve and the parallel portion just above the taper can be easily pushed through the sleeve until the bottom end of the screw section 16 of the extraction tool reaches the top of the sleeve. Using a suitable wrench applied to the square-section part 19, the tool is now rotated so that the screw section enters the shell and thereby forms a thread in it, so that the shell is engaged on the tool, as shown in Step 4. Note that the thread is formed in the plug sleeve by deformation only, not by cutting, so that no swarf is produced.

Figure 5:
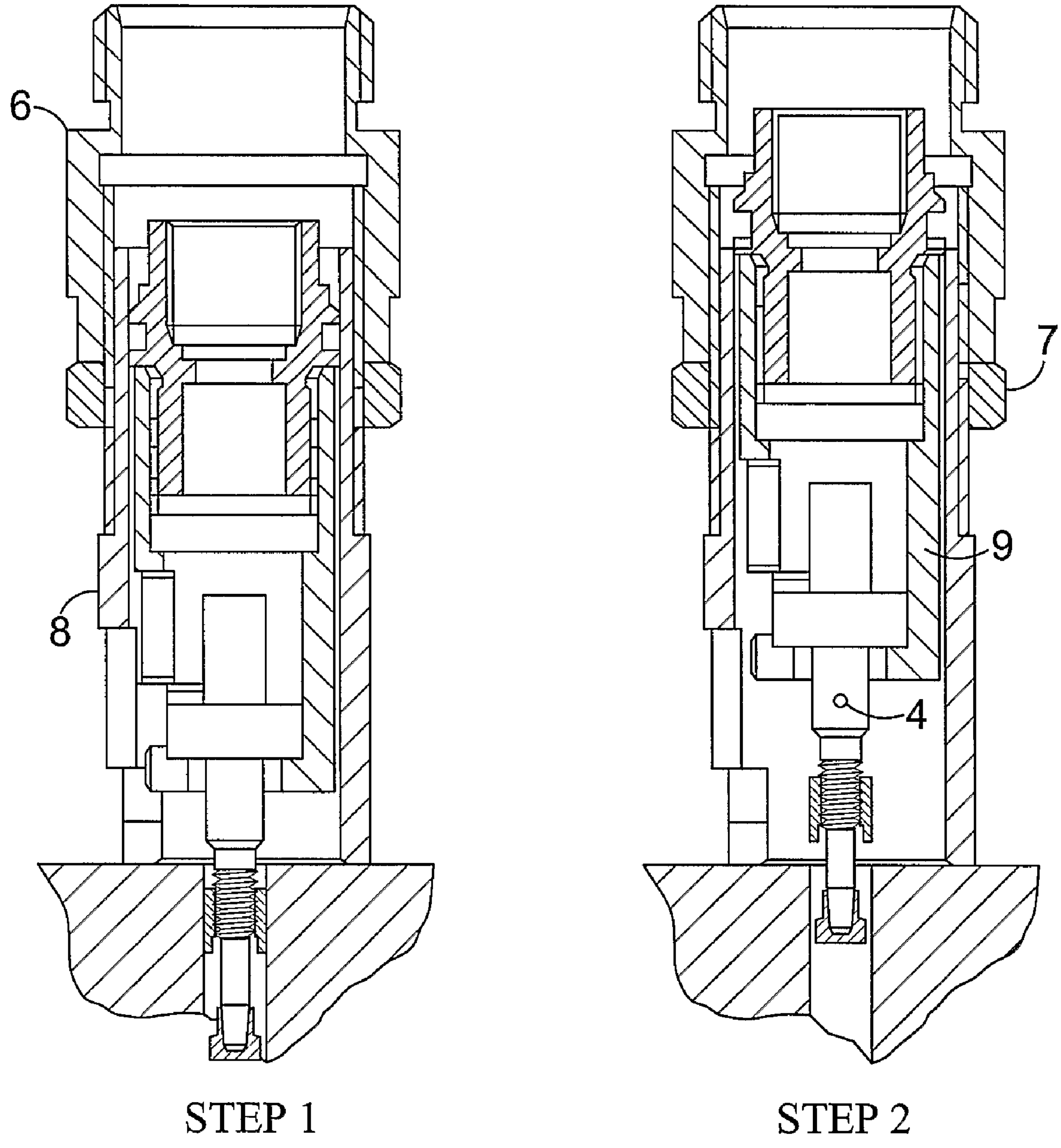
FIG. 5 shows two further steps in the use of the apparatus to remove the plug from the bore.

The tool is now pulled away from the workpiece so as to remove both the plug stem and the plug shell from the workpiece bore. This can be done by using the same type of pulling tool which is used to install plugs, with the plug-installation equipment removed from its front end and replaced by suitable connection adaptor to connect it to pull the installation tool 4 with respect to the workpiece. Such a tool may be pneumatically powered, such as that commercially available under the trademark GENESIS. Referring to FIG. 5, in Step 1 a removal body 9 is attached to the piston of the power tool, and an adaptor 6, removal sleeve 8 and locking ring 7 are also connected. Each of these has a slot extending along its side, and the sleeve 8 is rotationally adjusted so that its slot is in line with the slot on the removal body 9. With the power tool connected to the air supply, its front end is offered up to the plug extraction tool 4, so that the rear end of the plug extraction tool enters through the side access slot and goes fully into the removal body. The removal sleeve 8 is then extended until in contact with the workpiece face and is then locked in position. The power tool is then actuated, allowing a full piston stroke, which forcibly removes the plug from the workpiece, as shown in Step 2 of FIG. 5. If necessary a second actuation of the tool may be given if the tool piston stroke is insufficient to remove the sleeve fully from the workpiece. The tool is then disconnected from the air supply, the positions of the removal sleeve adjusted so that the extraction tool and the plug can be removed from the power tool. The plug sleeve is manually unscrewed from the threaded portion of the extraction tool, and the stem head is removed from the punch.

The extraction tool and the method of using described in the foregoing example have practical advantages. Both parts of the removed plug are securely held by the tool, and cannot drop down the bore, and no swarf or broken-off portions are produced. The extraction tool is repeated re-usable, whereas the tool disclosed in GB 2 319 200 A requires the use of adhesive to secure the plug stem to part of the tool which must then be thrown away and replaced by another disposable part. Furthermore the preparatory operations of drilling and swarf removal as described in the present example are quicker and easier to perform than the cleaning, degreasing, adhesive application and curing stages as required in the prior art. Another practical advantage of the present invention is that the tapered punch retains the stem portion far more securely than the adhesive patch of the prior art, thus avoiding possible accidental loss of the stem portion prior to extraction from the bore.

The invention claimed is:

1. A sealing plug removal apparatus comprising:

a tool body having a punch portion and a threaded portion provided along an axial axis of the tool body, the punch portion extending between a first end of the punch portion having a first diameter and a second end of the punch portion having a second diameter, where the second diameter is greater than the first diameter, and the threaded portion having a thread forming portion configured to form threads in a sleeve of a sealing plug, and further comprising a cylindrical portion extending between the punch portion and the threaded portion, where a diameter of the cylindrical portion is no greater than the second diameter of the punch portion.

2. The sealing plug removal apparatus as claimed in claim 1, wherein the punch portion is tapered, such that a diameter of the punch portion increases from the first end of the punch portion along the axial axis of the tool body towards the second end of the punch portion.

3. The sealing plug removal apparatus as claimed in claim 1, wherein the thread portion is configured to form threads in a sleeve of a sealing plug by deformation.

4. The sealing plug removal apparatus as claimed in claim 1, further comprising a flange portion configured to retard the lateral motion of a tool in a direction toward the first end of the punch portion.

5. The sealing plug removal apparatus as claimed in claim 4, further comprising an engagement portion adjacent the flange, wherein the engagement portion is configured for engaging with a wrench.

6. The sealing plug removal apparatus as claimed in claim 1, wherein the sealing plug removal apparatus is a unitary structure.

7. The sealing plug removal apparatus as claimed in claim 1, further comprising a power tool, the power tool comprising a piston for engaging with the tool body.

* * * * *